US010957986B2

(12) United States Patent
Baghdasarian

(10) Patent No.: US 10,957,986 B2
(45) Date of Patent: Mar. 23, 2021

(54) RECONFIGURABLE SPACECRAFT WITH A HOLD-DOWN ASSEMBLY FOR A RIGID REFLECTOR

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 774 days.

(21) Appl. No.: 15/669,470

(22) Filed: Aug. 4, 2017

(65) Prior Publication Data
US 2019/0044245 A1 Feb. 7, 2019

(51) Int. Cl.
*H01Q 15/14* (2006.01)
*B64G 1/66* (2006.01)
(Continued)

(52) U.S. Cl.
CPC ............ *H01Q 15/14* (2013.01); *B64G 1/222* (2013.01); *B64G 1/66* (2013.01); *H01Q 1/288* (2013.01);
(Continued)

(58) Field of Classification Search
CPC .......... H01Q 15/14; H01Q 3/08; H01Q 1/288; B64G 1/222; B64G 1/66; B64G 2004/005
See application file for complete search history.

(56) References Cited

U.S. PATENT DOCUMENTS

| 5,642,122 A | 6/1997 | Lockie et al. |
| 5,644,322 A | 7/1997 | Hayes et al. |

(Continued)

FOREIGN PATENT DOCUMENTS

WO WO 2016/144884 A1 9/2016

OTHER PUBLICATIONS

Extended European Search Report dated Dec. 10, 2018 in Application No. 18186803.5.
(Continued)

*Primary Examiner* — Assres H Woldemaryam
(74) *Attorney, Agent, or Firm* — Weaver Austin Villeneuve & Sampson LLP

(57) ABSTRACT

A spacecraft, reconfigurable from a launch configuration to an on-orbit configuration, includes a main body structure, a manipulator, a first deployable rigid reflector and an attachment arrangement, including at least one hold-down assembly (HDA). In the launch configuration, the HDA is in a fully engaged configuration such that the attachment arrangement mechanically attaches the first reflector with the spacecraft main body structure and prevents relative motion between the first reflector and the spacecraft main body. Reconfiguring the spacecraft from the launch configuration to the on-orbit configuration includes (i) actuating the HDA from the fully engaged configuration to a partially engaged configuration; (ii) grasping and moving the first reflector, with the manipulator, a distance in the first direction; and (iii) moving the first reflector from a first position proximate to the attachment arrangement to a second position proximate to a deployed position associated with the on-orbit configuration.

17 Claims, 8 Drawing Sheets

(51) Int. Cl.
*H01Q 3/08* (2006.01)
*H01Q 1/28* (2006.01)
*B64G 1/22* (2006.01)
*B64G 4/00* (2006.01)

(52) U.S. Cl.
CPC ......... *H01Q 3/08* (2013.01); *B64G 2004/005* (2013.01)

(56) References Cited

U.S. PATENT DOCUMENTS

| | | |
|---|---|---|
| 5,673,459 A | 10/1997 | Baghdasarian |
| 6,124,835 A | 9/2000 | Nguyen et al. |
| 6,448,940 B1 | 9/2002 | Chiang |
| 8,448,902 B2 | 5/2013 | Gelon |
| 8,789,796 B2 | 7/2014 | Boccio et al. |
| 9,248,922 B1 * | 2/2016 | Baghdasarian ........ B64G 1/222 |
| 2003/0057328 A1 * | 3/2003 | Maruno .................. B64G 1/10 244/158.1 |
| 2007/0146227 A1 | 6/2007 | Brooks et al. |
| 2008/0143636 A1 * | 6/2008 | Couchman ............... B64G 1/66 343/915 |
| 2012/0325973 A1 | 12/2012 | Vezain et al. |
| 2016/0226135 A1 * | 8/2016 | Grangerat ............. H01Q 1/288 |
| 2016/0264264 A1 * | 9/2016 | Helmer ................... B64G 4/00 |
| 2016/0322710 A1 * | 11/2016 | Grosroyat ................ H01Q 1/08 |
| 2016/0372822 A1 * | 12/2016 | Mayeux ................ H01Q 1/288 |

OTHER PUBLICATIONS

European Office Action dated Oct. 1, 2019 issued in EP Application No. 18186803.5.

* cited by examiner

RECONFIGURABLE SPACECRAFT WITH A HOLD-DOWN ASSEMBLY FOR A RIGID REFLECTOR

TECHNICAL FIELD

This invention relates generally to spacecraft, and more particularly to an improved arrangement for attaching multiple reflectors to a spacecraft structure.

BACKGROUND

The assignee of the present invention designs and manufactures spacecraft for communications and broadcast services. Market demands for such spacecraft have imposed increasingly stringent requirements on spacecraft payload capacity. To meet these demands, spacecraft with an increased quantity of antenna reflectors and/or with reflectors having an increased aperture size are desirable.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with fairing envelope constraints of such launch vehicles as, for example, Ariane V, Atlas XEPF, Proton, Falcon 9, and Sea Launch. As a result, it is very often a requirement to reconfigure a spacecraft from a launch configuration to an on-orbit configuration by repositioning an antenna reflector from a stowed (launch) position to a deployed (on-orbit) position. Some techniques related to this requirement are disclosed in U.S. Pat. Nos. 5,644,322, 6,448,940, 8,789,796 and 8,448,902, assigned to the assignee of the present disclosure, the disclosures of which are hereby incorporated by reference into the present application in their entirety.

A spacecraft may be configured with a deployable reflector, where moving the reflector from a stowed location to a deployed location is accomplished by means other than the arrangements with which the reflector is attached to the spacecraft in the launch configuration and in the on-orbit configuration. Instead, the deployable reflector may be moved from the stowed location to the deployed location by a mechanism which may be or include a multipurpose manipulator configured for grasping and moving any number of deployable reflectors as disclosed in US Pat. Pub 2016-0264264, assigned to the assignee of the present disclosure, the disclosure of which is hereby incorporated by reference into the present application in their entirety.

SUMMARY

The present inventor has appreciated that a spacecraft may be configured such that, in a launch configuration, a stack of multiple large reflectors are securely restrained in a manner compatible with launch dynamic loads with a hold-down arrangement that supports the reflectors. Advantageously, the hold-down arrangement may be configured to be commandably reconfigurable from a fully engaged configuration (to withstand launch loads) to a partially engaged configuration in which the reflectors are movable by a manipulator.

According to some implementations, a spacecraft, reconfigurable from a launch configuration to an on-orbit configuration, includes a main body structure, a manipulator, at least a first deployable rigid reflector, and an attachment arrangement, including at least one hold-down assembly. In the launch configuration, the at least one hold-down assembly is in a fully engaged configuration such that the attachment arrangement mechanically attaches the first reflector with the main body structure so as to prevent relative motion of the first reflector with respect to the spacecraft main body in each of six degrees of freedom. Reconfiguring the spacecraft from the launch configuration to the on-orbit configuration includes actuating the at least one hold-down assembly from the fully engaged configuration to a partially engaged configuration such that the attachment arrangement permits movement of the first reflector in a first direction, grasping, with the manipulator, the first reflector, moving the first reflector, with the manipulator, a distance in the first direction sufficient to disengage the first reflector from the attachment arrangement, and moving the first reflector, with the manipulator, from a first position proximate to the attachment arrangement to a second position proximate to a deployed position associated with the on-orbit configuration.

In some examples, when the at least one hold-down assembly is in the partially engaged configuration, the attachment arrangement may provide a slight resistance to motion of the first reflector in the first direction, the slight resistance being sufficient to prevent drift motion of the first reflector with respect to the attachment arrangement. In some examples, when the at least one hold-down assembly is in the partially engaged configuration, the hold-down assembly is configured to prevent translation or rotation of the first reflector other than translation in the first direction.

In some examples, in the launch configuration, an aperture plane of the first reflector may be orthogonal to a yaw axis of the spacecraft and a centroid of the aperture plane is substantially aligned with the yaw axis of the spacecraft and the first direction may be parallel to the yaw axis.

In some examples, actuation of the at least one hold-down assembly from the fully engaged configuration to the partially engaged configuration may not impart any substantial motion of the first reflector.

In some examples, each hold-down assembly may include an elongated housing and is disposed such that a long axis of the elongated housing is parallel to the first direction. In some examples, the elongated housing of at least one hold-down assembly may be disposed so as to protrude through a respective hole in a surface of the reflector. In some examples, when the hold-down assembly is in the fully engaged configuration and when the hold-down assembly is in the partially engaged configuration, the elongated housing may be fixedly coupled with the spacecraft main body.

According to some implementations, a spacecraft includes a main body structure, a manipulator, a stack of multiple large reflectors in a position forward of a forward surface of the spacecraft's main body structure, and an attachment arrangement, including at least one hold-down assembly; the at least one hold-down assembly being commandably reconfigurable from a fully engaged configuration to a partially engaged configuration. When the at least one hold-down assembly is in the fully engaged configuration, the attachment arrangement securely restrains the reflectors in a manner compatible with launch dynamic loads. When the at least one hold-down assembly is in the partially engaged configuration, at least a first one of the reflectors is movable by the manipulator in a first direction.

In some examples, when the at least one hold-down assembly is in the partially engaged configuration, the attachment arrangement may provide a slight resistance to motion of the first one of the reflectors in the first direction, the slight resistance being sufficient to prevent drift motion of the first one of the reflectors with respect to the attachment arrangement. In some examples, when the at least one hold-down assembly is in the partially engaged configuration, the hold-down assembly may be configured to prevent translation or rotation of the first one of the reflectors other than translation in the first direction.

In some examples, in a launch configuration, an aperture plane of the first one of the reflectors may be orthogonal to a yaw axis of the spacecraft and a centroid of the aperture plane may be substantially aligned with the yaw axis of the spacecraft, and the first direction may be parallel to the yaw axis.

In some examples, actuation of the at least one hold-down assembly from the fully engaged configuration to the partially engaged configuration may not impart any substantial motion of the first one of the reflectors.

In some examples, each hold-down assembly may include an elongated housing and may be disposed such that a long axis of the elongated housing is parallel to the first direction. In some examples, the elongated housing of at least one hold-down assembly may be disposed so as to protrude through a respective hole in a surface of the reflector. In some examples, when the hold-down assembly is in the fully engaged configuration and when the hold-down assembly is in the partially engaged configuration, the elongated housing may be fixedly coupled with the spacecraft main body.

According to some implementations, a method includes reconfiguring a spacecraft from a launch configuration to an on-orbit configuration. The spacecraft includes a main body structure, a manipulator, at least a first deployable rigid reflector; and an attachment arrangement, including at least one hold-down assembly. In the launch configuration, the at least one hold-down assembly is in a fully engaged configuration such that the attachment arrangement mechanically attaches the first reflector with the main body structure so as to prevent relative motion of the first reflector with respect to the spacecraft main body structure in each of six degrees of freedom. Reconfiguring includes actuating the at least one hold-down assembly from the fully engaged configuration to a partially engaged configuration such that the attachment arrangement permits movement of the first reflector in a first direction, grasping, with the manipulator, the first reflector, moving the first reflector, with the manipulator, a distance in the first direction sufficient to disengage the first reflector from the attachment arrangement, and moving the first reflector, with the manipulator, from a first position proximate to the attachment arrangement to a second position proximate to a deployed position associated with the on-orbit configuration.

In some examples, when the at least one hold-down assembly is in the partially engaged configuration, the attachment arrangement may provide a slight resistance to motion of the first reflector in the first direction, the slight resistance being sufficient to prevent drift motion of the first reflector with respect to the attachment arrangement. In some examples, when the at least one hold-down assembly is in the partially engaged configuration, the hold-down assembly may be configured to prevent translation or rotation of the first reflector other than translation in the first direction.

In some examples, in the launch configuration, an aperture plane of the first reflector may be orthogonal to a yaw axis of the spacecraft and a centroid of the aperture plane may be substantially aligned with the yaw axis of the spacecraft, and the first direction may be parallel to the yaw axis.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
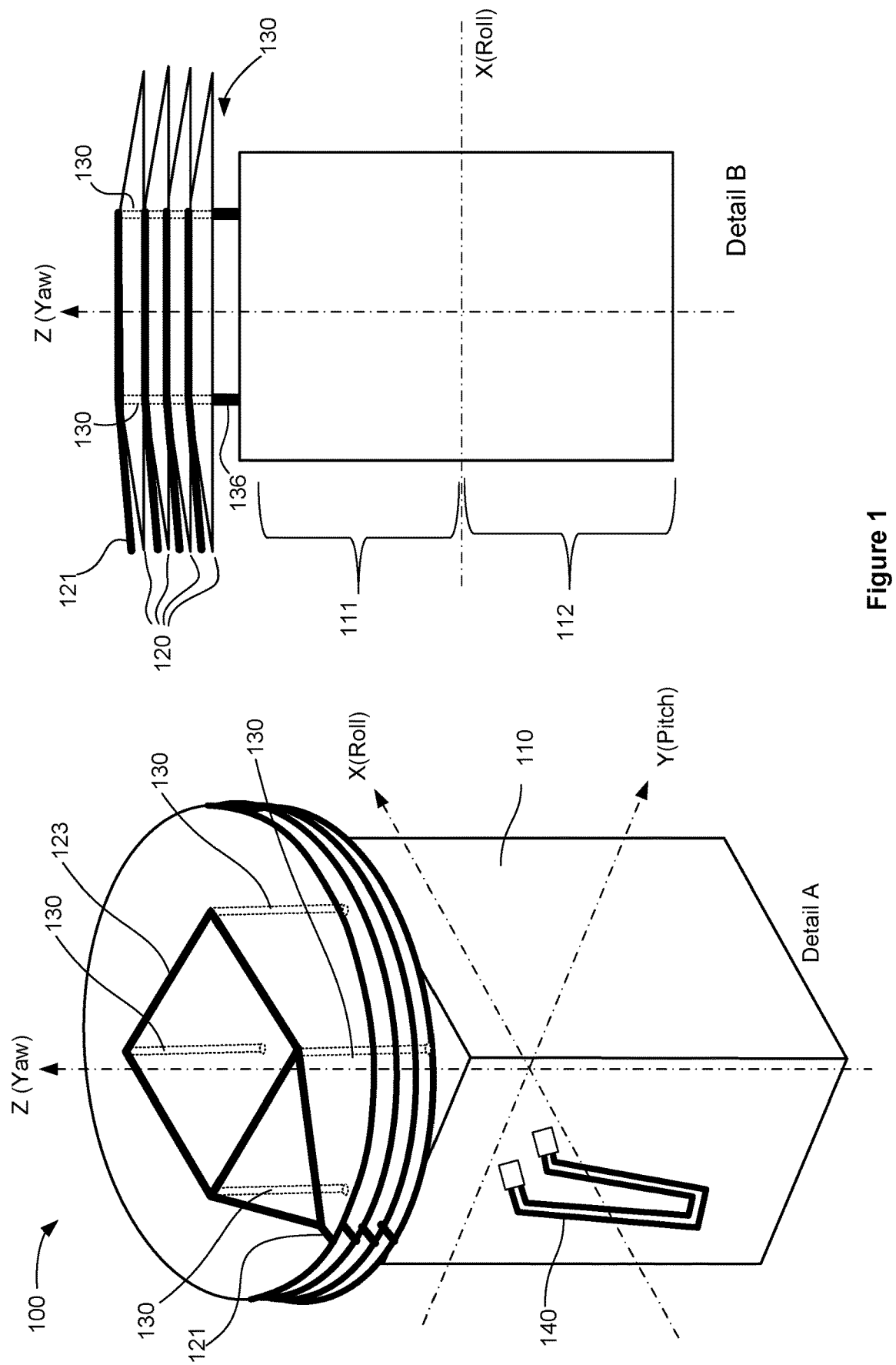
FIG. 1 illustrates a perspective view and an elevation view of an example spacecraft, according to an implementation FIG. 2 provides an expanded view of the forward portion of the spacecraft main body and stacked rigid reflectors, according to an implementation.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening feature s may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The presently described techniques relate to a spacecraft including one or more rigid reflectors. The spacecraft includes an attachment arrangement for the reflectors that includes at least one reconfigurable hold-down assembly. The attachment arrangement facilitates reconfiguring the spacecraft from a launch configuration to an on-orbit configuration. In the launch configuration, the reflectors are mechanically attached with a main body of the spacecraft in such a way as to withstand launch dynamic loads. The attachment arrangement includes one or more hold-down assemblies that are commandably reconfigurable from a fully engaged configuration (to withstand launch loads) to a partially engaged configuration in which the reflectors are movable by the manipulator. In some implementations, in the launch configuration, a stack of multiple large reflectors is disposed in a position forward of a forward surface of the spacecraft's main body, such that the reflectors, in the launch configuration, are securely restrained in a manner compatible with the launch dynamic loads.

During launch, in the fully engaged configuration, the attachment arrangement supports the reflectors and is rigidly attached to the reflectors with a structural interface capable of withstanding launch dynamic loads. Following launch, the hold-down assemblies may be reconfigured to the partially engaged configuration. When the hold-down assemblies are in the partially engaged configuration, the attachment arrangement may cause the reflectors to be only lightly restrained, in, for example, a single degree of freedom. As a result, the reflectors may be moved by a deployment mechanism, including the manipulator, for example, but are restrained from drifting away from the attachment arrangement. The reflectors may also be restrained from motion other than that corresponding to the first degree of freedom.

FIG. 1 illustrates a perspective view (Detail A) and an elevation view (Detail B) of an example spacecraft 100, according to an implementation, as the spacecraft 100 may be disposed in a launch configuration. The spacecraft 100 includes a main body structure 110. The main body structure 110 may be regarded as including an aft portion 112 that is disposed, in the launch configuration, proximal to a launch vehicle upper stage (not illustrated) and a forward portion 111 distal to the launch vehicle upper stage. During launch, the primary acceleration vector will be approximately aligned with the Z (Yaw) axis. In the illustrated example, the spacecraft 100 includes a number of deployable rigid reflectors 120 that are disposed, in the launch configuration, stacked forward of the forward portion 111. Each rigid reflector 120 has an aperture plane the centroid of which is approximately aligned with the yaw axis of the spacecraft, the aperture plane being approximately orthogonal to the yaw axis of the spacecraft. In the illustrated implementation, four rigid reflectors 120 are depicted, but a greater or a lesser number of rigid reflectors 120 may be contemplated by the present disclosure. Each reflector 120 may include a backup structure 123 and a grappling interface 121 that is mechanically coupled with the backup structure 123.

In the launch configuration, the rigid reflectors 120 are mechanically attached with the spacecraft main body 110 by way of an attachment arrangement described hereinbelow, that includes one or more elongated hold-down assemblies 130. In the illustrated implementation, four hold-down assemblies 130 are depicted, but a greater or a lesser number of hold-down assemblies 130 may be contemplated by the present disclosure. When the spacecraft 100 is in the illustrated launch configuration, the hold-down assemblies 130 may be in a "fully engaged" configuration. When each hold-down assembly 130 is in the fully engaged configuration the attachment arrangement may rigidly couple the reflectors 120 with the spacecraft main body 110. Advantageously, when each hold-down assembly 130 is in the fully engaged configuration, the attachment arrangement may rigidly restrain relative motion of each reflector 120 with respect to the spacecraft main body 110 in each of six degrees of freedom.

As described in more detail below, the hold-down assemblies 130 may be commandably reconfigured from the fully engaged configuration to a "partially engaged" configuration. When each hold-down assembly 130 is in the partially engaged configuration, the attachment arrangement provides only slight resistance to motion along at least a first axis. As a result, when each hold-down assembly 130 is in the partially engaged configuration, the reflectors 120 may be moved by a deployment mechanism but are restrained from drifting away from the attachment arrangement. A robotic manipulator 140 may be configured to grasp respective grappling interfaces 121 of each reflector, one by one, and translate the respective reflector 120 along the first axis. The first axis, in the illustrated example, may be approximately parallel to the yaw axis.

Figure 2:
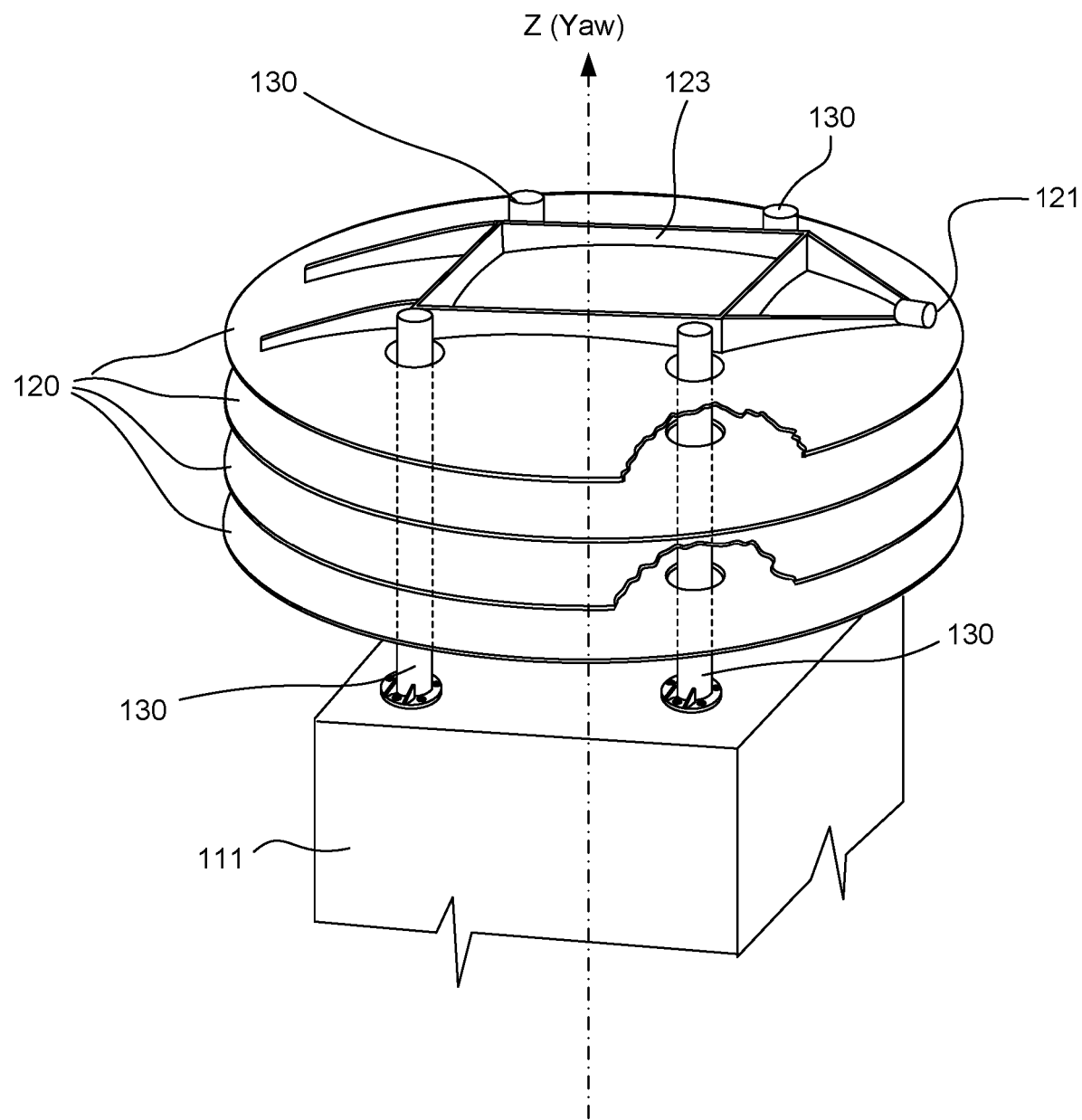

FIG. 2 provides an expanded view of the forward portion 111 of the spacecraft main body and stacked rigid reflectors 120. The reflectors 120 are coupled with the spacecraft main body 110 by way of the attachment arrangement that, in the illustrated implementation, consists of the four hold-down assemblies 130. The hold-down assemblies 130 may include release devices (omitted for clarity). Each hold-down assembly 130 may protrude through respective holes or apertures provided through reflective surfaces of the rigid reflectors 120 and engage with the respective backup structure 123 of each rigid reflector 120. The hold-down assemblies 130 may be fixedly coupled with the spacecraft main body 110 whether the hold-down assembly 130 is in the fully engaged configuration or in the partially engaged configuration. The hold-down assemblies 130 may include a hollow interior within which at least portions of the respective release devices may be disposed.

The release devices may be operable to reconfigure the hold-down assemblies 130 from the fully engaged configuration to the partially engaged configuration. The release devices may be detachably coupled with one or more electromechanical linkages (not illustrated) disposed within or proximate to the hold-down assemblies 130. Advantageously, when the hold-down assemblies 130 are in the partially engaged configuration, each reflector 120 may be translated along the first axis (approximately parallel to the spacecraft yaw axis in the illustrated configuration). Translation of the reflector 120 may be controlled by the robotic manipulator 140.

Figure 3:
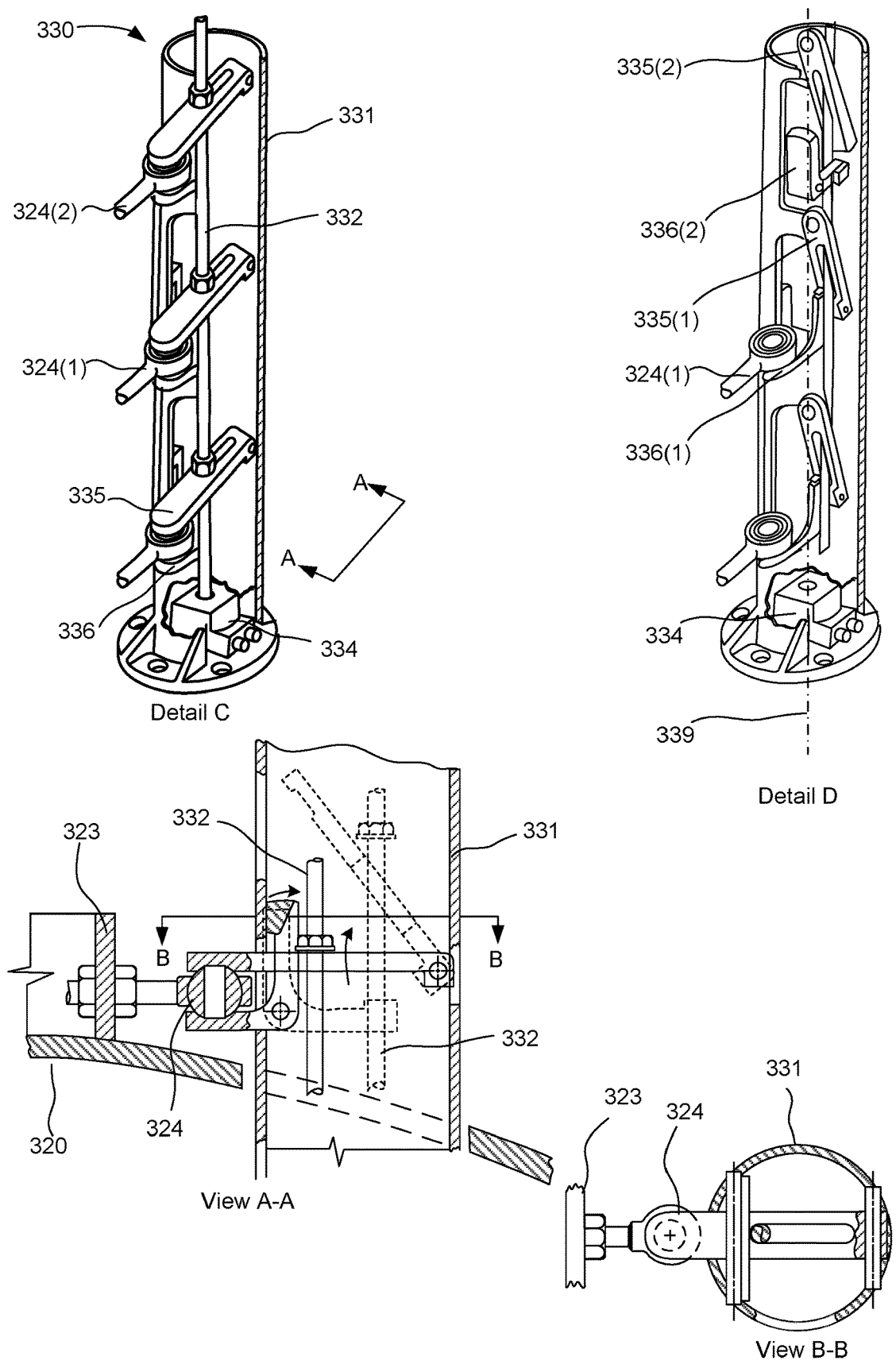
FIG. 3 illustrates an example of a hold-down assembly, according to an implementation

FIG. 3 illustrates an example of a hold-down assembly according to an implementation. In the illustrated example, a hold-down assembly 330 includes a housing ("support tube") 331, a tensioning rod 332 and a release device 334. The tensioning rod 332 may be detachably engaged with the release device 334. In the launch configuration illustrated in Detail C, the hold-down assembly 330 is mechanically coupled ("fully engaged") with a plurality of antenna reflectors 320 by way of retractable upper arms 335 and retractable lower arms 336. A respective retractable upper arm 335 and retractable lower arm 336 may be configured to engage with a coupling interface 324 of a rigid reflector 320 (omitted for clarity in Detail C). As may be better observed in View AA, the coupling interface 324 may be mechanically attached with a backup structure 323 of the rigid reflector 320. In the launch configuration illustrated in Detail C, the tensioning rod 332 may be secured in place by release device 334. The tensioning rod 332 may be preloaded so as to cause respective retractable upper arms 335 and retractable lower arms 336 to exert a clamp-like engagement force on respective coupling interfaces 324. In the illustrated implementation, three retractable upper arms 335 and three retractable lower arms 336 are depicted, but a greater or a lesser number may be contemplated by the present disclosure.

Detail D illustrates a configuration of the hold-down assembly 330 after the tensioning rod 332 has been disengaged from (released by) release device 334. As may be observed in View AA, and by comparing Detail D with Detail C, as a result of disengaging from the release device 334, the clamp-like engagement force exerted by the tensioning rod 332 is released and the retractable upper arms 335 are free to retract into the support tube 331. In some implementations, the retractable upper arm 335 may be spring-loaded, so as to retract into the support tube 331 upon disengagement of the tensioning rod 332 from the release device 334. Whether or not the retractable upper arms 335 are spring-loaded, the retractable upper arm 335, following disengagement of the tensioning rod 332 from the release device 334, may be configured to avoid impeding motion of the coupling interface 324.

In the configuration illustrated by Detail D, a coupling interface 324(2) has been removed and retractable lower arms 336(2) is shown as being retracted into the support tube 331. The illustrated configuration may arise, for example, after a robotic manipulator (not illustrated) has moved a rigid reflector to which coupling interface 324(2) is attached in a direction parallel to a longitudinal axis 339 of the hold-down assembly 330. The manipulator may move the reflector a distance sufficient to disengage the reflector from the attachment arrangement of which hold-down assembly 339 is part.

In the configuration illustrated by Detail D, the coupling interface 324(1) remains partially engaged by the hold-down assembly 320. More particularly, the coupling interface 324(1) remains in contact with retractable lower arm 336(1). As a result, motion of the reflector in directions other than parallel to the axis 339 may be impeded.

Figure 4:
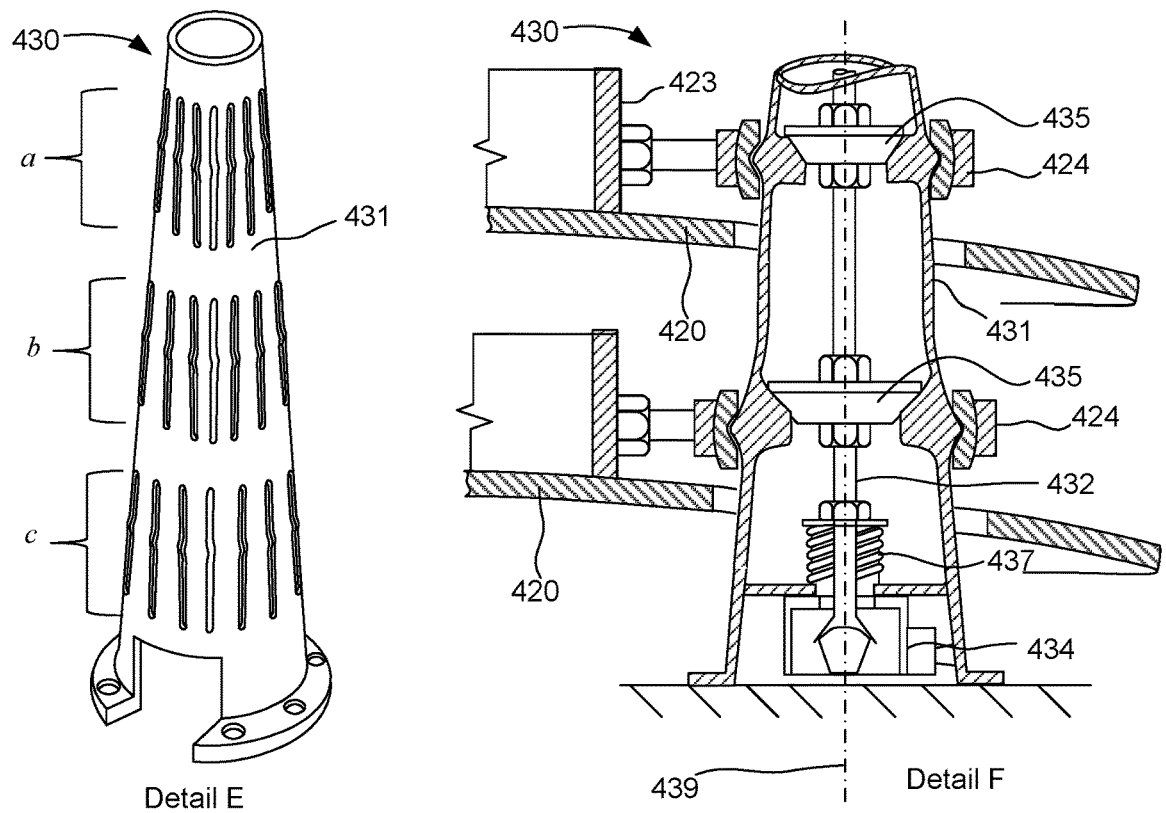
FIG. 4 illustrates an example of a hold-down assembly according to another implementation.

FIG. 4 illustrates an example of a hold-down assembly according to another implementation. In the illustrated example, a hold-down assembly 430 includes a housing 431, a tensioning rod 432 and a release device 434. Detail E depicts an external perspective view of the housing 431. The housing 431 may have a tapered or conical wall profile and include wall portions that are radially flexible. For example, in the illustrated implementation, radially flexible wall portions are disposed in locations a, b and c of the housing 431.

Detail F depicts a partial cutaway view of the hold-down assembly 430 shown together with two rigid reflectors 420 that each includes a respective backup structure 423. Coupling interfaces 424, depicted in a perspective view in Detail H, may be mechanically coupled with the backup structure 423. The tensioning rod 432 may be detachably engaged with the release device 434. Conical bushings 435 may be mechanically coupled with the tensioning rod 432. In the launch configuration illustrated in Detail F, the tensioning rod 432 may be secured in place by release device 434 and may be preloaded so as to exert a downward force on the conical bushings 435 which in turn press outward against internal protrusions in the housing 431 and cause corresponding wall segments of the housing 431 to flex outward and engage with respective coupling interfaces 424.

Detail G illustrates a configuration of a portion of the hold-down assembly 430 after the tensioning rod 432 has been disengaged from (released by) release device 434. As may be observed by comparing Detail G with Detail F, as a result of disengaging from the release device 434, the tensioning rod 332, and conical bushings 435 mechanically coupled therewith, are free to move upward. In the illustrated implementation, a spring 437 may urge the tensioning rod 432 to move upward. As a result of moving upward, the conical bushings 435 become disengaged with the internal protrusions of the housing 431 and the outward pressure of the conical bushings 435 against the internal protrusions is released. As a result, corresponding wall segments of the housing 431 are free to flex and disengage with interior surfaces of respective coupling interfaces 424. Thus, in the configuration illustrated in Detail G, the hold-down assembly does not impede motion of the coupling interface 424 in a direction parallel to the longitudinal axis 439 of the hold-down assembly 430.

Figure 5:
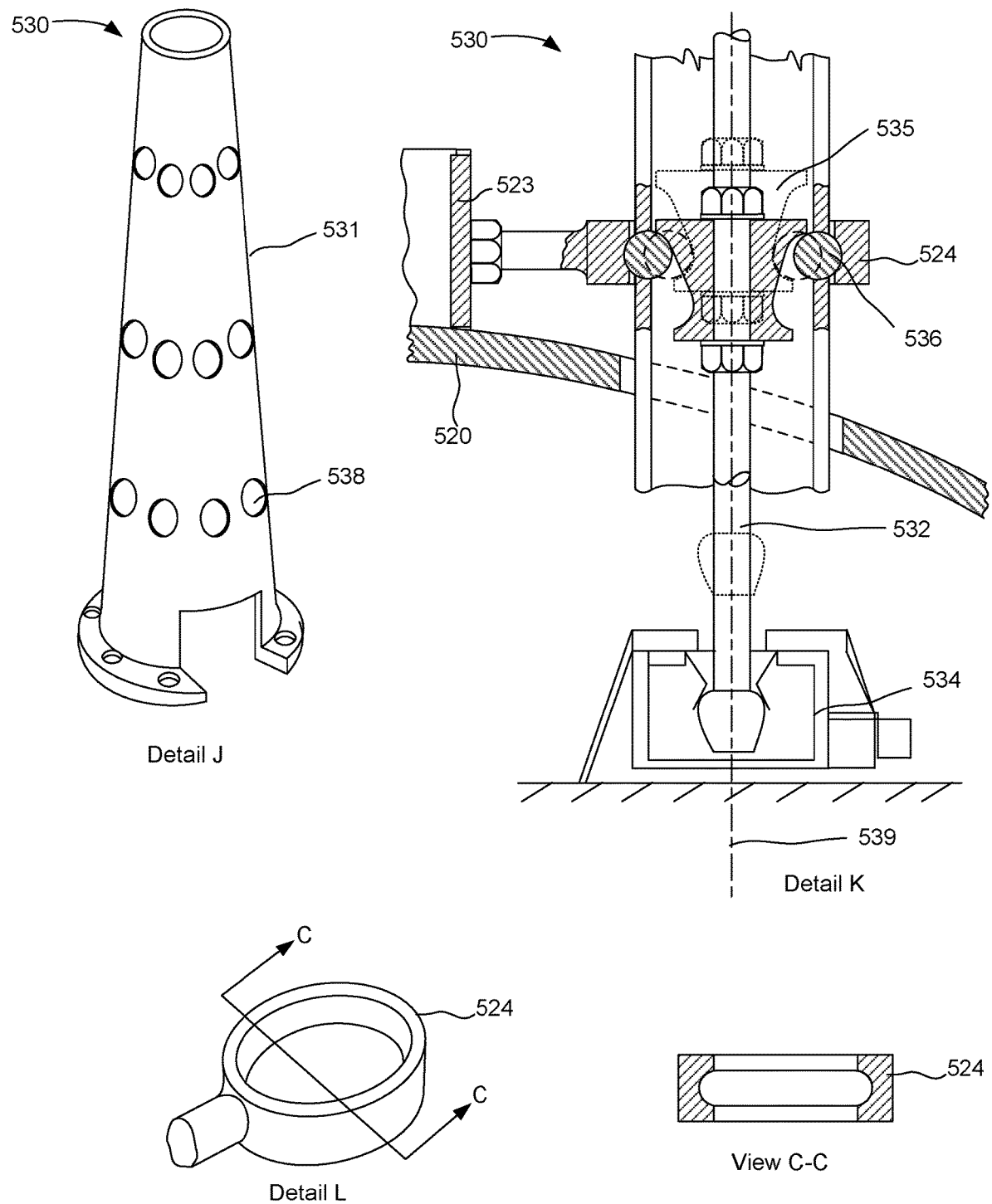
FIG. 5 illustrates an example of a hold-down assembly according to a yet further implementation.

FIG. 5 illustrates an example of a hold-down assembly according to a yet further implementation. In the illustrated example, a hold-down assembly 530 includes a housing 531, a tensioning rod 532 and a release device 534. Detail J depicts an external perspective view of the housing 531. The housing 531 may include apertures 538 through which bearings 536 may partially protrude.

Detail K depicts a partial cutaway view of a hold-down assembly 530 shown together with a rigid reflector 520 that includes a respective backup structure 523. Coupling interfaces 524, depicted in Detail L and View C-C, may be mechanically coupled with the backup structure 523. The tensioning rod 532 may be detachably engaged with the release device 534. A bushing 535 may be mechanically coupled with the tensioning rod 532. As illustrated in Detail K, when the tensioning rod 532 is secured in place by release device 534, the tensioning rod 532 may exert a downward force on the bushing 535 which in turn urges bearings 536 outward so as to engage with an interior surface of coupling interfaces 524. Referring still to Detail K, as a result of disengaging from the release device 534, the tensioning rod 532, and bushings 535 mechanically coupled therewith, are free to move upward. In some implementations, a spring (not illustrated) may urge the tensioning rod 532 to move upward. As a result of the bushing 535 moving upward, the bearings 536 are free to retract inward and become disengaged with interior surfaces of respective coupling interfaces 524. As a result, the hold-down assembly 530 does not impede motion of the coupling interface 524 in a direction parallel to the longitudinal axis 539 of the hold-down assembly 530 once the tensioning rod 532 is disengaged from the release device 534.

Figure 6:
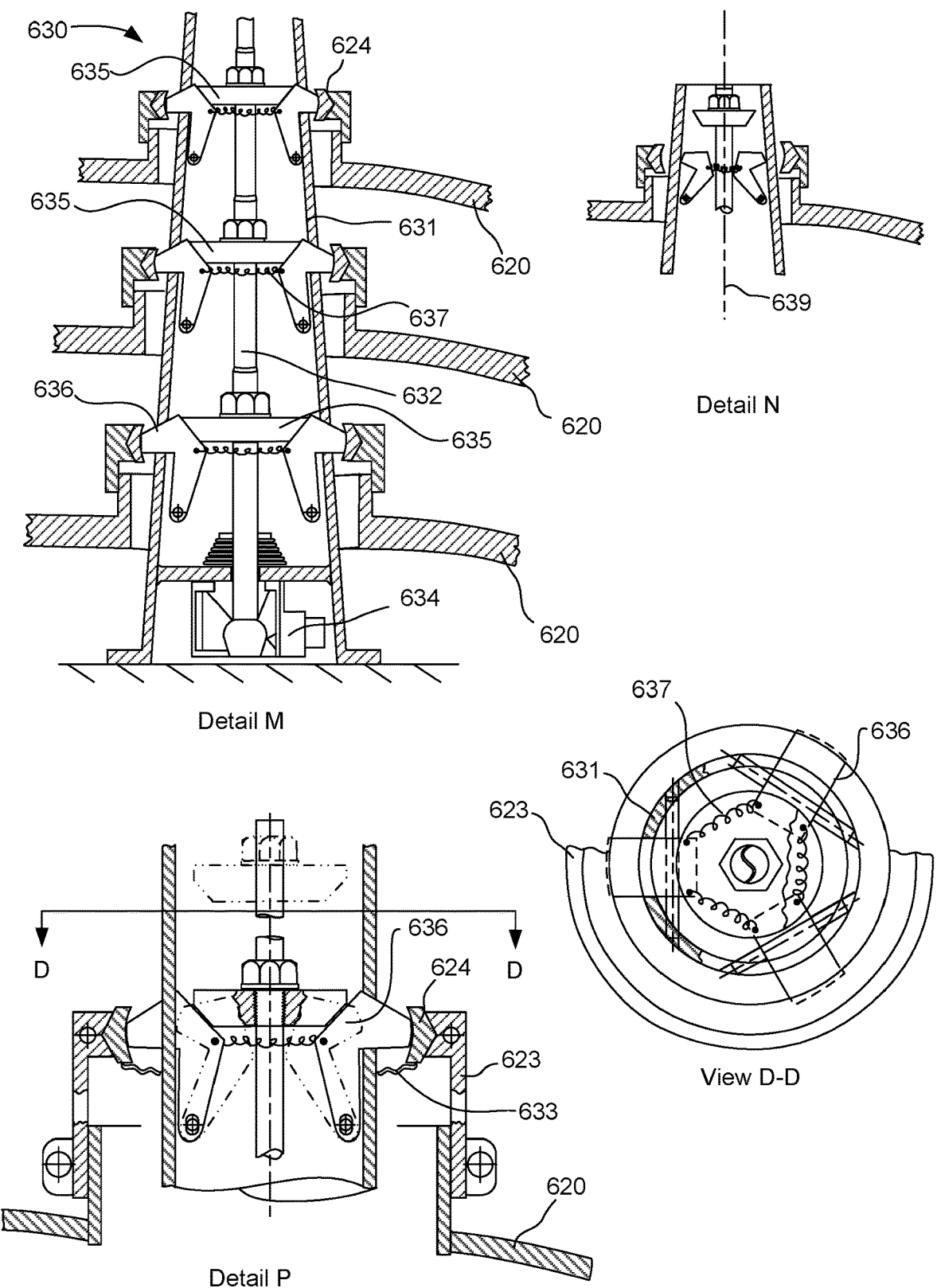
FIG. 6 illustrates an example of a hold-down assembly according to another implementation.

FIG. 6 illustrates an example of a hold-down assembly according to another implementation. In the illustrated example, a hold-down assembly 630 includes a housing 631, a tensioning rod 632 and a release device 634. Detail M depicts a cutaway view of the hold-down assembly 630 shown together with three rigid reflectors 620 that each includes a respective backup structure 623 (Detail P). As depicted in the example implementation, the housing 631 may have a tapered or conical wall profile. Coupling interfaces 624 may be mechanically coupled with the backup structure 623. The tensioning rod 632 may be detachably engaged with the release device 634. Conical bushings 635 may be mechanically coupled with the tensioning rod 632. In the launch configuration illustrated in Detail M, the tensioning rod 632 may be secured in place by release device 634 and may be preloaded so as to exert a downward force on the conical bushings 635 which in turn press retractable members 636 outward so as to engage with respective coupling interfaces 624.

Detail N illustrates a configuration of a portion of the hold-down assembly 630 after the tensioning rod 632 has been disengaged from (released by) release device 634. As may be observed in Detail N, and by comparing Detail N with Detail P, as a result of disengaging from the release device 634, the tensioning rod 632, and conical bushings 635 mechanically coupled therewith, are free to move upward. In some implementations, a spring (not illustrated) may urge the tensioning rod 632 to move upward. As a result of moving upward, the conical bushings 635 become disengaged with the retractable members 636 and the outward pressure of the conical bushings 635 against the retractable members 636 is released. In the illustrated implementation, the retractable members 636 are spring loaded by a spring 637 configured to urge the retractable members 636 inward. Whether or not the retractable members 636 are spring-loaded, the retractable members 636, following disengagement of the tensioning rod 632 from the release device 634, may be configured to avoid impeding motion of the coupling interface 624. In the illustrated implementation, a member 633, which may be configured as an elastic wiper strip, may provide a slight impedance to motion of the coupling interface 624 with respect to the hold-down assembly 630. The member 633 may include an adhesive interface of the coupling interface 624 and the housing 631. The member 633 may be configured to restrain the reflector 620 from drifting away from the hold-down assembly 630 prevent coupling interface. Thus, in the configuration illustrated in FIG. 6, the hold-down assembly provides a slight resistance to drift motion of the coupling interface 624 but does not prevent the reflector 620 from being moved by a deployment mechanism, including the manipulator, in a direction parallel to the longitudinal axis 639 of the hold-down assembly 630.

Figure 7:
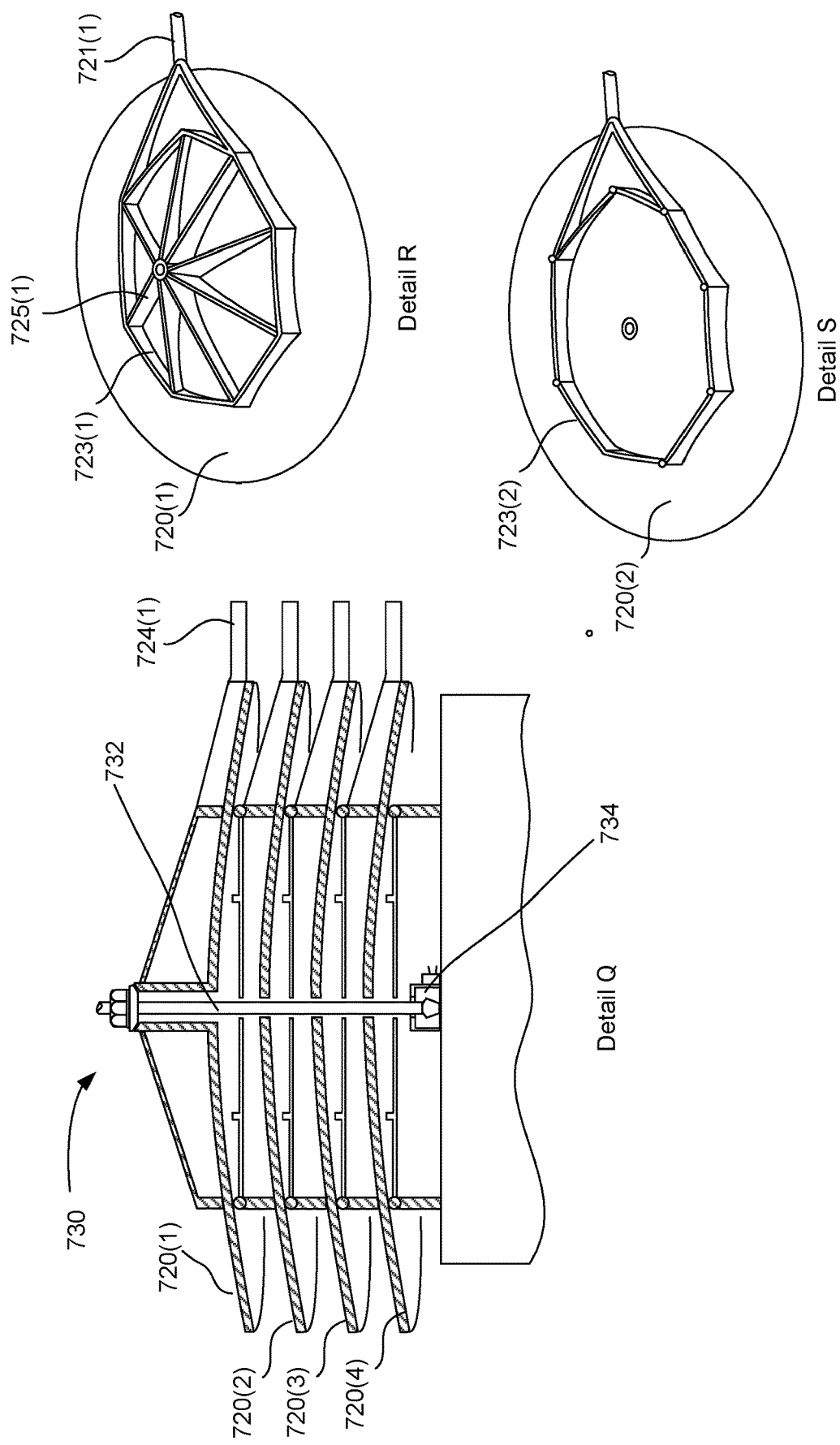
FIG. 7 illustrates an example of a hold-down assembly according to a yet further implementation. I

FIG. 7 illustrates an example of a hold-down assembly according to a yet further implementation. In the illustrated example, a hold-down assembly 730 includes a tensioning rod 732 and a release device 734. Detail Q depicts a cutaway view of the hold-down assembly 730 shown together with four rigid reflectors 720 that each includes a respective backup structure 723. The tensioning rod 732 may be detachably engaged with the release device 734. In the launch configuration illustrated in Detail Q, the tensioning rod 732 may be secured in place by release device 734 and may be preloaded so as to exert a downward force on radial members 725(1) of the uppermost reflector 720(1) (Detail R) which in turn press backup structure 723(1) so as to engage with a lower reflector 720(2) (Detail S). Thus, in the configuration illustrated by FIG. 7, the attachment arrangement consists of a single hold-down mechanism 730.

Figure 8:
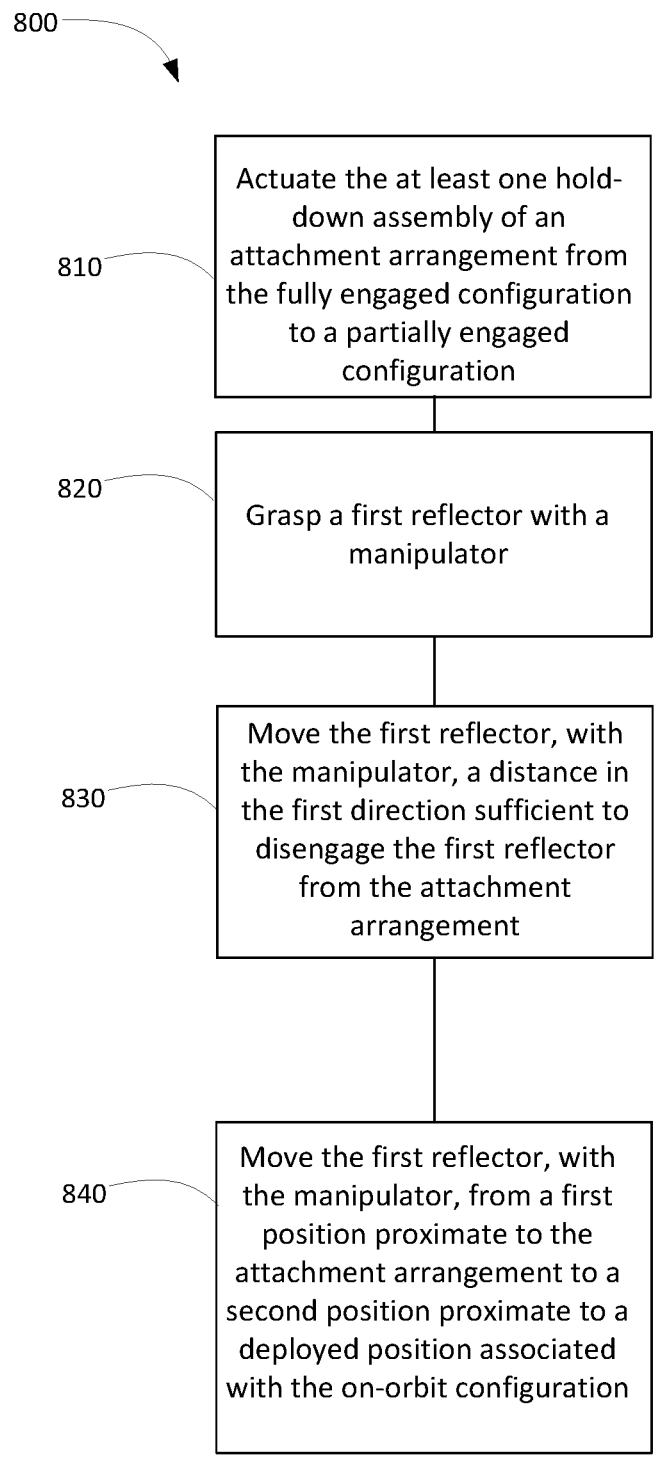
FIG. 8 illustrates a process flow diagram for reconfiguring a spacecraft from a launch configuration to an on-orbit configuration, according to an implementation.

FIG. 8 illustrates a process flow diagram for reconfiguring a spacecraft from a launch configuration to an on-orbit configuration, according to an implementation. As described hereinabove the spacecraft may include a main body structure, a manipulator, at least a first deployable rigid reflector; and an attachment arrangement, including at least one hold-down assembly. In the launch configuration, the at least one hold-down assembly is in a fully engaged configuration such that the attachment arrangement mechanically attaches the first reflector with the spacecraft main body structure so as to prevent relative motion of the first reflector with respect to the spacecraft main body in each of six degrees of freedom. The method 800 may start, at block 810 with actuating the at least one hold-down assembly from the fully engaged configuration to a partially engaged configuration such that the attachment arrangement permits movement of the first reflector in a first direction. At block 820, the first reflector may be grasped with the manipulator.

At block 830, the first reflector may be moved, with the manipulator, a distance in the first direction sufficient to disengage the first reflector from the attachment arrangement. At block 840, the first reflector may be moved, with the manipulator, from a first position proximate to the attachment arrangement to a second position proximate to a deployed position associated with the on-orbit configuration Thus, improved techniques for coupling multiple rigid reflectors with a spacecraft main body structure have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft, reconfigurable from a launch configuration to an on-orbit configuration, the spacecraft comprising:
   a main body structure;
   at least a first deployable rigid reflector, including a grappling interface;
   a first arrangement that attaches the first reflector to the spacecraft in the launch configuration; and
   a second arrangement, other than the first arrangement, for moving the first reflector; wherein:
      the first arrangement comprises an attachment arrangement, including at least one hold-down assembly and the second arrangement comprises a manipulator;
      in the launch configuration, the at least one hold-down assembly is in a fully engaged configuration such that the attachment arrangement mechanically attaches the first reflector with the main body structure so as to prevent relative motion of the first reflector with respect to the spacecraft main body in each of six degrees of freedom;
      the at least one hold-down assembly is actuatable from the fully engaged configuration to a partially engaged configuration such that the attachment arrangement permits movement of the first reflector in a first direction;
      the manipulator is configured to:
         grasp the first reflector by way of the grappling interface;
         move the first reflector a distance in the first direction sufficient to disengage the first reflector from the attachment arrangement; and
         move the first reflector from a first position proximate to the attachment arrangement to a second position proximate to a deployed position associated with the on-orbit configuration; and
      when the at least one hold-down assembly is in the partially engaged configuration, the hold-down assembly is configured to prevent rotation of the first reflector and to prevent translation of the reflector in any direction other than the first direction.

2. The spacecraft of claim 1, wherein, when the at least one hold-down assembly is in the partially engaged configuration, the attachment arrangement provides a slight resistance to motion of the first reflector in the first direction, the slight resistance being sufficient to prevent drift motion of the first reflector with respect to the attachment arrangement.

3. The spacecraft of claim 1, wherein:
   in the launch configuration, an aperture plane of the first reflector is orthogonal to a yaw axis of the spacecraft and a centroid of the aperture plane is substantially aligned with the yaw axis of the spacecraft; and
   the first direction is parallel to the yaw axis.

4. The spacecraft of claim 1, wherein actuation of the at least one hold-down assembly from the fully engaged configuration to the partially engaged configuration does not impart any substantial motion of the first reflector.

5. The spacecraft of claim 1, wherein each hold-down assembly includes an elongated housing and is disposed such that a long axis of the elongated housing is parallel to the first direction.

6. The spacecraft of claim 5, wherein the elongated housing of at least one hold-down assembly is disposed so as to protrude through a respective hole in a surface of the reflector.

7. The spacecraft of claim 5, wherein, when the hold-down assembly is in the fully engaged configuration and when the hold-down assembly is in the partially engaged configuration, the elongated housing is fixedly coupled with the spacecraft main body.

8. A spacecraft, comprising:
a main body structure;
a stack of multiple large reflectors in a position forward of a forward surface of the spacecraft's main body structure, at least one of the reflectors including a grappling interface;
a first arrangement that attaches the stack of reflectors to the spacecraft in the launch configuration; and
a second arrangement, other than the first arrangement, for moving the reflectors; wherein
the first arrangement includes an attachment arrangement, including at least one hold-down assembly and the second arrangement comprises a manipulator configured to grasp the grappling interface; wherein
the at least one hold-down assembly is commandably reconfigurable from a fully engaged configuration to a partially engaged configuration;
when the at least one hold-down assembly is in the fully engaged configuration, the attachment arrangement securely restrains the reflectors in a manner compatible with launch dynamic loads;
when the at least one hold-down assembly is in the partially engaged configuration, at least a first one of the reflectors is movable by the manipulator in a first direction; and
when the at least one hold-down assembly is in the partially engaged configuration, the hold-down assembly is configured to prevent rotation of the first reflector and to prevent translation of the reflector in any direction other than the first direction.

9. The spacecraft of claim 8, wherein, when the at least one hold-down assembly is in the partially engaged configuration, the attachment arrangement provides a slight resistance to motion of the first one of the reflectors in the first direction, the slight resistance being sufficient to prevent drift motion of the first one of the reflectors with respect to the attachment arrangement.

10. The spacecraft of claim 8, wherein:
in a launch configuration, an aperture plane of the first one of the reflectors is orthogonal to a yaw axis of the spacecraft and a centroid of the aperture plane is substantially aligned with the yaw axis of the spacecraft; and
the first direction is parallel to the yaw axis.

11. The spacecraft of claim 8, wherein actuation of the at least one hold-down assembly from the fully engaged configuration to the partially engaged configuration does not impart any substantial motion of the first one of the reflectors.

12. The spacecraft of claim 8, wherein each hold-down assembly includes an elongated housing and is disposed such that a long axis of the elongated housing is parallel to the first direction.

13. The spacecraft of claim 12, wherein the elongated housing of at least one hold-down assembly is disposed so as to protrude through a respective hole in a surface of the reflector.

14. The spacecraft of claim 12, wherein, when the hold-down assembly is in the fully engaged configuration and when the hold-down assembly is in the partially engaged configuration, the elongated housing is fixedly coupled with the spacecraft main body.

15. A method comprising:
reconfiguring a spacecraft from a launch configuration to an on-orbit configuration, wherein
the spacecraft includes a main body structure, at least a first deployable rigid reflector including a grappling interface;
a first arrangement that attaches the first reflector to the spacecraft in the launch configuration; and
a second arrangement, other than the first arrangement, for moving the first reflector; wherein:
the first arrangement comprises an attachment arrangement, including at least one hold-down assembly and the second arrangement comprises a manipulator;
in the launch configuration, the at least one hold-down assembly is in a fully engaged configuration such that the attachment arrangement mechanically attaches the first reflector with the main body structure so as to prevent relative motion of the first reflector with respect to the spacecraft main body structure in each of six degrees of freedom; and
reconfiguring includes:
actuating the at least one hold-down assembly from the fully engaged configuration to a partially engaged configuration such that the attachment arrangement permits movement of the first reflector in a first direction;
grasping, with the manipulator, the first reflector by way of the grappling interface;
moving the first reflector, with the manipulator, a distance in the first direction sufficient to disengage the first reflector from the attachment arrangement; and
moving the first reflector, with the manipulator, from a first position proximate to the attachment arrangement to a second position proximate to a deployed position associated with the on-orbit configuration; and
when the at least one hold-down assembly is in the partially engaged configuration, the hold-down assembly is configured to prevent rotation of the first reflector and to prevent translation of the reflector in any direction other than the first direction.

16. The method of claim 15, wherein, when the at least one hold-down assembly is in the partially engaged configuration, the attachment arrangement provides a slight resistance to motion of the first reflector in the first direction, the slight resistance being sufficient to prevent drift motion of the first reflector with respect to the attachment arrangement.

17. The method of claim 15, wherein:
in the launch configuration, an aperture plane of the first reflector is orthogonal to a yaw axis of the spacecraft and a centroid of the aperture plane is substantially aligned with the yaw axis of the spacecraft; and
the first direction is parallel to the yaw axis.

* * * * *